(12) United States Patent
Holloway et al.

(10) Patent No.: US 11,682,943 B2
(45) Date of Patent: Jun. 20, 2023

(54) MOTOR/GENERATOR WITH ATMOSPHERIC STATOR PRESSURE

(71) Applicant: Amber Kinetics, Inc., Union City, CA (US)

(72) Inventors: Mark J. Holloway, Mountain View, CA (US); Peter Thomas Tennessen, Oakland, CA (US)

(73) Assignee: Amber Kinetics, Inc., Union City, CA (US)

( * ) Notice: Subject to any disclaimer, the term of this patent is extended or adjusted under 35 U.S.C. 154(b) by 63 days.

(21) Appl. No.: 17/216,688

(22) Filed: Mar. 30, 2021

(65) Prior Publication Data

US 2022/0320955 A1 Oct. 6, 2022

(51) Int. Cl.
*H02K 7/02* (2006.01)
*H02K 5/12* (2006.01)

(52) U.S. Cl.
CPC ............ *H02K 7/02* (2013.01); *H02K 5/12* (2013.01); *H02K 2205/09* (2013.01)

(58) Field of Classification Search
CPC ............ H02K 7/02; H02K 7/025; H02K 7/09; H02K 5/00; H02K 5/08; H02K 5/22; H02K 9/00; H02K 9/19; H02K 19/00; H02K 19/10; H02K 19/10612; H02K 19/16; H02K 19/18; H02K 19/20
See application file for complete search history.

(56) References Cited

U.S. PATENT DOCUMENTS

2018/0006539 A1* 1/2018 Sanders .................. H02K 3/28

FOREIGN PATENT DOCUMENTS

| CN | 105811646 | * | 7/2016 | ............ H02K 7/025 |
| WO | WO2019037836 | * | 2/2019 | .......... F16C 32/0438 |

* cited by examiner

*Primary Examiner* — Tran N Nguyen
(74) *Attorney, Agent, or Firm* — Soquel Group LLC

(57) ABSTRACT

The invention is a motor/generator that includes a motor/generator housing that encloses a rotor assembly, which rotates a shaft, and a stator assembly that remains stationary, and where the motor/generator is inside a vacuum chamber, which, during normal operation, is evacuated of gas and operates at a lower air pressure than atomospheric air pressure, and a cylindrical vacuum barrier between the rotor assembly and the stator assembly that together with the motor generator housing partitions the motor/generator into an interior rotor volume and an exterior stator volume, enabling the rotor volume and stator volume to operate at different atmospheric pressures.

19 Claims, 3 Drawing Sheets

MOTOR/GENERATOR WITH ATMOSPHERIC STATOR PRESSURE

BACKGROUND

Field of Art

This description generally relates to motor/generators, and particularly to motor/generators that operate inside a vacuum chamber.

Description of Related Art

A flywheel is one type of energy storage system that stores energy as rotational kinetic energy. A flywheel rotor is a weighted, rotationally symmetric mass that spins while physically coupled, directly or indirectly, to a motor/generator. When power is received for storage, the rotor is driven, increasing the rotational speed of the flywheel rotor. When power is to be extracted, the flywheel rotor drives the motor/generator. The faster a flywheel rotor can spin, the more energy it can store, but the faster it spins, the higher the rotational losses due to aerodynamic drag. A flywheel energy storage system stores kinetic energy in a flywheel rotor. Kinetic energy is transferred to or stored in the rotor by increasing the angular velocity of the rotor. And, vice versa, energy is extracted from the rotor by decreasing the angular velocity of the rotor.

To reduce aerodynamic drag, the flywheel is operated in a housing which is evacuated, to operating pressures that equate to small fractions of an atmosphere. In certain embodiments of a flywheel energy storage system the motor/generator is placed within the same housing or vacuum chamber as the rotor. However, the placement of a motor/generator within a vacuum chamber can result in undesirable effects. For example, stator components may outgas into the vacuum chamber, reducing the service life of vacuum pumps or requiring more expensive vacuum pumps to maintain a vacuum. As another example, stator windings may heat up, which may require added cooling componentry. One substantial concern is that electrical breakdown, governed by the Paschen curve, is a direct concern when operating at sub-ambient pressures with voltages about 300 V. In a low pressure environment, with voltages above 300 V, special care is needed in the design of insulation and shielding systems to avoid corona discharge and partial discharge hazards.

Thus, it is with respect to these considerations and others that the present invention has been made.

SUMMARY

The invention is a motor/generator with an interior rotor volume in which a rotor assembly operates and a surrounding, exterior, stator volume in which a stator assembly operates that enables the stator assembly to operate a atmospheric pressure.

The motor/generator has an exterior housing and the rotor assembly is partitioned from the stator assembly within the housing by a cylindrical vacuum chamber made of an impermeable material.

In certain embodiments, there are one or more vents in the motor/generator housing that enable air to enter the stator volume, enabling the stator assembly to operate at atmospheric pressure while the rotor assembly operates in a vacuum within the vacuum chamber.

In certain embodiment, the motor/generator includes a motor/generator housing that encloses a rotor assembly, which rotates a shaft, and a stator assembly that remains stationary, and where the motor/generator is inside a vacuum chamber, which, during normal operation, is evacuated of gas and operates at a lower air pressure than atomospheric air pressure, and a cylindrical vacuum barrier between the rotor assembly and the stator assembly that together with the motor generator housing partitions the motor/generator into an interior rotor volume and an exterior stator volume, enabling the rotor volume and stator volume to operate at different atmospheric pressures.

In certain embodiments, the motor/generator operates within a flywheel device and is attached to a flywheel housing. In such embodiments, the shaft is a shaft of a flywheel rotor and the motor generator is disposed within the vacuum chamber that houses the flywheel rotor.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Modern flywheel energy storage systems operate in a vacuum enclosure, in order to avoid frictional losses from residual gas drag. As such, it is preferred to integrate an electromagnetic motor/generator with the energy storage rotor within the vacuum enclosure, and to make the integration as seamless as possible. For example, it is preferred to avoid belts, pulleys, gears, long shafts, etc. Ideally, the rotor of the electromagnetic motor/generator is very tightly coupled to the flywheel rotor, avoiding the need for substantial additional mechanical coupling elements.

Flywheel Energy Storage System

Figure 1:
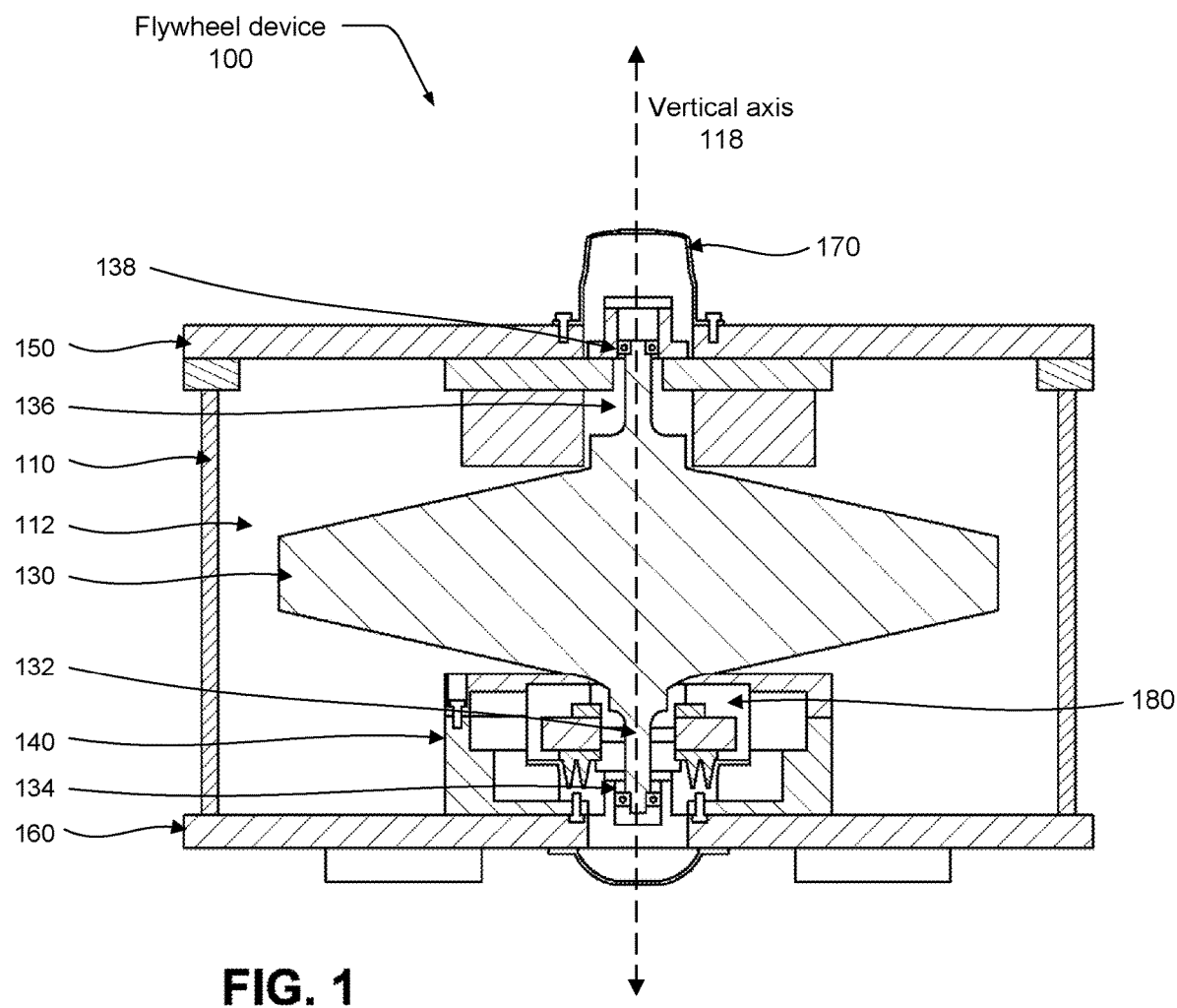
FIG. 1 is a simplified cross section view one embodiment of a flywheel energy storage system, also referred to as a flywheel unit.

FIG. 1 is a simplified cross section view of one embodiment of a flywheel energy storage device 100, also referred to as flywheel device 100 or simply flywheel 100 with a flywheel housing 110, or enclosure, 110, according to one embodiment. Flywheel device 100 includes a flywheel rotor 130, a motor and generator 140, hereinafter referred to as motor/generator 140 because both functions are typically performed by a single subsystem. Generally, hereinbelow, the term flywheel device refers to a single flywheel housing 110 and any rotors, motor/generators and other elements that it houses as well as any power electronic elements, which may be housed within or mounted on or near flywheel housing 110, as depicted in FIG. 1, or which may be housed separately from flywheel unit 100.

A sealed interior volume of flywheel housing 110 in which flywheel rotor 130 resides is referred to as a vacuum chamber 112, or simply chamber 112. In certain embodiments, chamber 112 is fully or partially evacuated of gas or air. In certain embodiments, chamber 112 is formed by housing 110, which includes a top plate 150, a bottom plate 160, a top vacuum cap 170 and a bottom vacuum cap 175. In certain embodiments, there may be no separate top plate 150, or bottom plate 160, or top vacuum cap 170, or bottom vacuum cap 175; i.e. one or more of these elements may be integral with housing 110, i.e. not separate elements from housing 110.

Motor/generator 140 converts between electrical and mechanical energy, so that energy can be stored in or drawn from the flywheel 130. Motor/generator 140 typically combines the function of a motor and a generator or a motor and an alternator into a single subsystem. Motor/generator 140 couples to flywheel rotor 130 either directly, through a shaft of flywheel rotor 130, or indirectly, for example using a stub shaft that attaches on one end to flywheel rotor 130 and on the other end to a supporting bearing. As illustrated, motor/generator 140 couples through a lower shaft 132 to flywheel rotor 130. In turn lower shaft 132 is supported by lower bearings 134, which enable rotation. In addition, an upper shaft 136 couples with an upper bearing 138.

Motor/generator 140 includes a rotor assembly that rotates along with flywheel rotor 130 and a stator assembly that is stationary and attaches to housing 110. Motor generator 140 includes a vacuum barrier 180 positioned between its rotor assembly and its stator assembly, as described hereinbelow with reference to FIGS. 2 and 3. The rotor assembly operates at the reduced pressure of vacuum chamber 112 while the stator assembly operates at atmospheric pressure. It may be appreciated that the term atmospheric pressure, as used herein refers to the atmospheric pressure at the location of flywheel device 100. Vacuum barrier 180 is described in greater detail hereinbelow with reference to FIGS. 2 and 3.

In certain embodiments, flywheel unit 100 rests on feet, a pedestal or another stabilizing mechanism.

Although flywheel housing 110 is shown as enclosing a single flywheel rotor 130 and a single motor/generator 140 in other embodiments a single housing may enclose multiple rotors and/or motor/generators.

Motor/Generator Description

Figure 2:
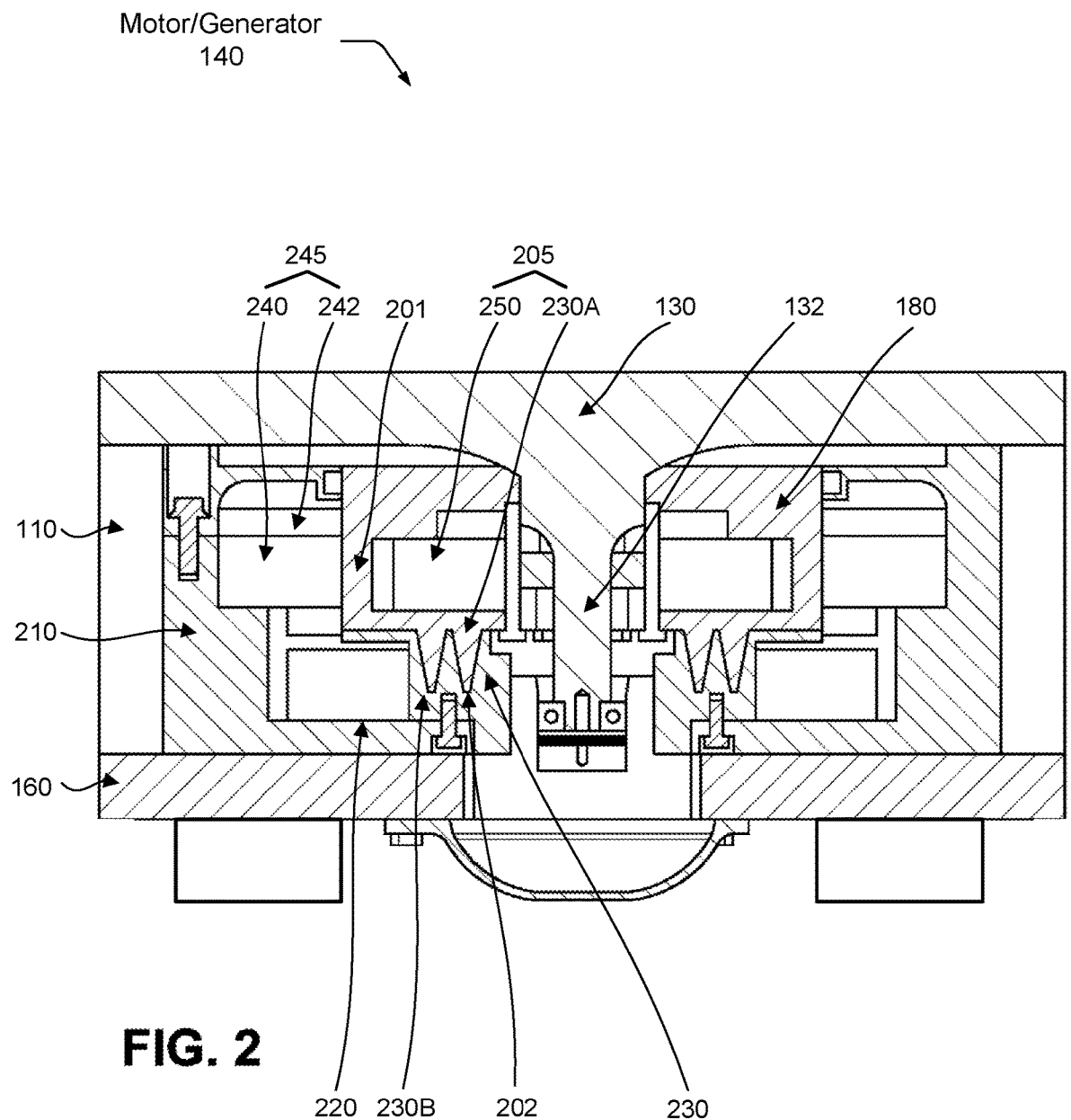
FIG. 2 is a detailed cross section view of one embodiment of a flywheel that shows a vacuum barrier between a rotor assembly and a stator assembly of a motor/generator.

FIG. 2 is a detailed cross section view of one embodiment of a flywheel that shows vacuum barrier 180 disposed between a rotor assembly and a stator assembly of a motor/generator. In certain embodiments, motor/generator 140 may be a homopolar motor as described in U.S. patent application Ser. No. 15/637,985, filed on Jun. 29, 2017, which is incorporated in its entirety by reference herein. Motor/generator 140 applies torque to a lower shaft 132 that is integral with or that couples with flywheel rotor 130. In certain embodiments, lower shaft 132 may be a stub shaft that couples with flywheel rotor 130. Embodiments of a stub shaft that may be used in the subject invention are described in U.S. Pat. No. 10,167,925, filed on Jul. 28, 2015, which is incorporated in its entirety by reference herein.

In certain embodiments, motor/generator 140 couples directly to a flywheel rotor. In such embodiments, a shaft is not required to couple the flywheel rotor 130 with motor/generator 140.

Motor/generator 140 includes a stator assembly 245 that includes a stator housing 210, a stator laminate stack 240 and a number of stator pole pieces 242, referred to henceforth as pole pieces 242, and a bottom portion of a field coupler 230, referred to as field coupler bottom portion 230B. Pole pieces 242 guide (or direct) magnetic flux across a first, or principle, radial gap 201 to a rotor assembly 205 to generate torque. Stator assembly 245 attaches to housing 110 and is stationary. In certain embodiments, stator assembly 245 further includes a field winding 220 that generates magnetic flux.

Rotor assembly 205 is coupled to and rotates with lower shaft 132, which in turn rotates flywheel rotor 130. Rotor assembly 205 includes a rotor laminate 250 and a top portion of a field coupler 230. The top portion, referred to as field coupler top portion 230A, rotates with rotor laminate 250. A bottom portion of field coupler 230, referred to as field coupler bottom portion 230B attaches to a housing 110 and remains stationary. Rotor laminate 250 is formed of a stack of steel laminations that serve to block AC eddy currents. Alternatively, rotor laminate 250 may be formed of solid steel.

In certain embodiments, field winding 220 is formed by a coil of insulated or anodized, thin, aluminum or copper wire. This provides a low resistance electrical conductor. Field winding 220 generates magnetic flux that magnetically energizes the first, radial, stator-rotor gap 201.

Field coupler 230 directs magnetic flux vertically, or axially, across a second gap 202 formed by the two interleaved portions of field coupler 230, namely between field coupler top portion 230A, which rotates with lower shaft 132 and rotor 130, and field coupler bottom portion 230B which remains stationary. Field coupler 230 provides a path for magnetic flux, generated by field winding 220, from its rotating upper portion 230A to its stationary lower portion 230B.

Generally, field winding 220 generates flux in a loop, which can be described as upward through field coupler 230 axial gap, through the rotating upper portion of field coupler 230A to the rotor laminate 250, across the primary radial gap, into stator pole pieces 242, then into stator housing 210, and then returns to the stationary lower portion field coupler 230B.

Vacuum barrier 180 isolates, partitions, or acts as a pressure barrier between rotor assembly 205 and stator assembly 245. The rotor assembly operates in the reduced pressure of vacuum chamber 112 while the stator assembly operates at a different, typically atmospheric, pressure.

It may be appreciated that while motor/generator 140 is illustrated as a homopolar motor, or more generally as a radial flux air gap machine, the subject invention, referred to herein as an atmospheric stator, may be applied to other types of motors. Generally, the invention may be applied to motors that have a significant air gap between a rotor and a stator. A minimum rotor-stator gap of substantially, or approximately, 1 mm is typical of conventional motors and is feasible in this application. However, depending on the material used for vacuum barrier 180 a somewhat larger gap of 2-6 mm is desirable. Gaps larger than 6 mm are also feasible. The types of radial air gap machines or motor/generators to which the invention may be applied include inter alia induction synchronous, permanent magnet synchronous, brushless permanent magnet, synchronous reluctance, switched reluctance, and homopolar synchronous. In addition, the invention may be used with axial air gap machines in which the rotor and stator are arranged axially.

Further, while motor/generator 140 is described herein in the context of flywheel device 100 its use is not limited to flywheel energy applications. The invention may be practiced in any application where it is desirable for a rotor assembly to operate at a pressure different than a stator assembly. While applications in which motor/generator 140 operates within a vacuum chamber gives one clear example of a situation in which it is desirable for a rotor assembly to operate at a different pressure than a stator assembly, the invention is not so limited and other applications are feasible.

Figure 3:
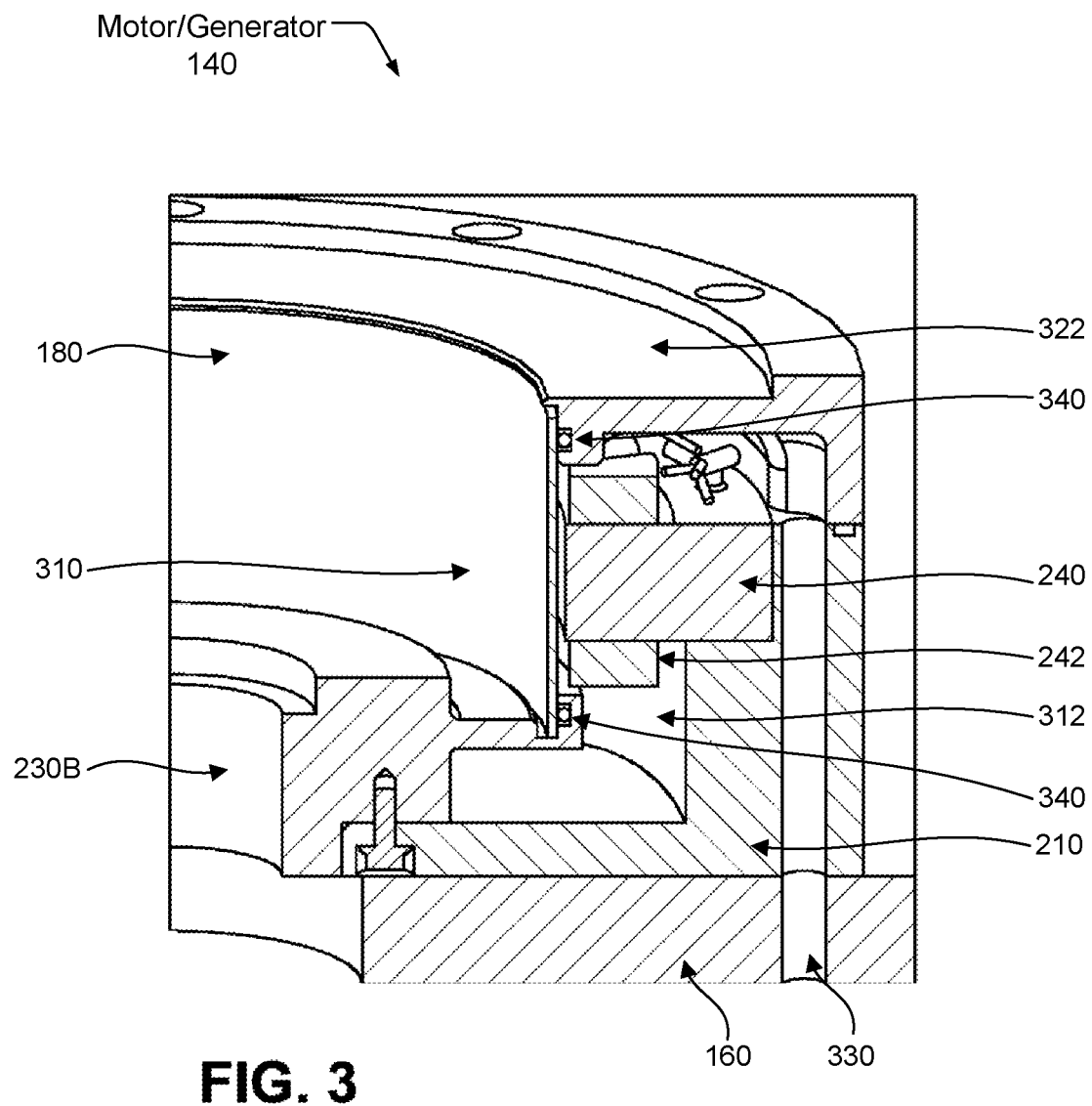
FIG. 3 is a cross section of the embodiment of a motor/generator that illustrates further detail about the position and function of a vacuum barrier.

FIG. 3 is a cross section of an embodiment of motor/generator 140 that illustrates the position and function of vacuum barrier 180. Vacuum barrier 180 is illustrated as a cylindrical enclosure or barrier that partitions motor/generator 140 into an interior volume 310 and an exterior volume 312. Interior volume 310 includes rotor assembly 205, lower shaft 132 and field coupler top portion 230A. Exterior volume 312 includes stator assembly 245, which includes stator laminate stack 240 and pole pieces 242, field coupler lower portion 230B, and seals 340. Thus, vacuum barrier 180 is disposed in the gap between rotor assembly 205 and stator assembly 245. Motor/generator 140 includes a motor/generator housing 320 with an annular shaped top stator cover 322. Together, motor/generator housing 320 and vacuum barrier 180 enclose and seal interior volume 310 and block the flow of gas between interior volume 310 and exterior volume 312.

Barrier 180 is typically constructed of an impermeable material such as inter alia: polymer with impermeable film (i.e. Parylene-C), polymer with deposited metal, low permeation polymer (i.e. PVDC, Kapton), glass, or ceramic. Other durable materials impermeable to gas are also feasible including inter alia plastic and rubber.

It may be appreciated that the size and shape of vacuum barrier 180, housing 320 and stator cover 322 may vary without departing from the scope and spirit of the subject invention. The essential function of vacuum barrier 180 is to partition motor/generator 140 by sealing rotor assembly 205, thus enabling it to operate in the reduced pressure of chamber 112 while also enabling stator assembly 245 to operate at atmospheric pressure. Thus, in certain embodiments, rotor assembly 205 operates at a reduced pressure and stator assembly 245 operates at atmospheric pressure. In yet other embodiments, rotor assembly 205 operates inside vacuum chamber 112 in a vacuum or near vacuum while stator assembly 245 operates at a relatively reduced pressure, i.e. a pressure less than atmospheric pressure. Even more generally, rotor assembly 245 may operate at a different pressure than the pressure at which stator assembly 245 operates.

While barrier 180 is depicted and described as a material boundary, other designs are feasible that yield a comparable effect of sealing stator assembly 245 and enabling it to operate at a different atmospheric pressure than rotor assembly 205. For example, stator assembly 245 may be encased by a solid barrier, made of plastic, or another suitable material. Generally, non-conductive, non-magnetic materials may be considered, such as glass or a low-gassing polymer. All such alternative embodiments fall within the scope and spirit of this invention.

In certain embodiments, motor/generator 140 is wholly contained within vacuum chamber 112. In the absence of vacuum barrier 180, the entirety of motor/generator 140 would have the same atmospheric pressure as that of vacuum chamber 112; i.e. it would operate in a near vacuum or at a reduced pressure. However, a vent 330 enables air or liquid to flow into exterior volume 312 through bottom plate 160 to enable it to operate at atmospheric pressure; or alternatively, at a reduced pressure when compared to the atmospheric pressure inside interior volume 310. In certain embodiments, vent 330 enables air to freely enter exterior volume 312; in other embodiments, vent 330 enables a fluid, e.g. a coolant, to enter exterior volume 312. In yet other embodiments, the flow of air into vent 330 is controlled in order to achieve a specified pressure. Although illustrated as a single vent, typically vent 330 refers to a number of vents, typically equidistant, that penetrate housing 320.

In certain embodiments a coolant flows through vent 330 into exterior volume 312. The coolant transfers heat away from the stator windings by convection. Coolant materials may inter alia include: propylene glycol, ethylene glycol, transformer oil, or dielectric fluid (e.g., 3M NOVEC).

In certain embodiments, one or more seals 340 are placed along the edges of vacuum barrier 180 to block the flow of gas or liquid into interior volume 312. Seals 340 may be made inter alia of elastomer o-ring, epoxy, or solder.

Benefits of Atmospheric Stator

Partitioning motor/generator 140 into an interior rotor assembly 205 and a surrounding stator assembly 245 with an atmospheric barrier provides a number of benefits, including:

Stator windings are cooled using external air or liquid coolant, thus (1) enabling higher motor power density, and (2) increasing motor lifetime by reducing operating temperature.

Outgassing by stator components into chamber 112 is reduced or eliminated, thus (1) reducing the cost of vacuum pumps, and (2) increasing the service life of vacuum pumps.

Upon reading this disclosure, those of skill in the art will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A motor/generator for a flywheel device, which operates within a vacuum chamber inside the flywheel device, wherein during normal operation the vacuum chamber is evacuated of gas and operates at a lower air pressure than atmospheric air pressure, comprising:
   a motor/generator housing;
   a rotor assembly coupled to a shaft of a flywheel rotor, wherein the rotor assembly is disposed inside the motor/generator housing and rotates along with the shaft about a central axis of the flywheel rotor;
   a stator assembly, inside the motor/generator housing, and surrounding the rotor assembly, wherein there is a radial gap between the rotor assembly and the stator assembly; and
   a cylindrical vacuum barrier disposed in the radial gap between the rotor assembly and the stator assembly, and wherein the vacuum barrier together with the motor generator housing; partitions the motor/generator into an interior rotor volume and an exterior stator volume, wherein the rotor volume is sealed to block the exchange of gas of liquid with the stator volume, enabling the rotor volume to operate at the same air pressure as in the vacuum chamber while the stator volume operates at a different air pressure.

2. The motor/generator of claim 1, wherein the motor/generator housing has one or more vents that enables gas or liquid to enter the stator volume.

3. The motor/generator of claim 2, wherein external air enters the stator volume through the one or more vents enabling the stator assembly to operate at atmospheric pressure.

4. The motor/generator of claim 1, further comprising one or more seals along the edges of the vacuum barrier to block the flow of gas or liquid into the interior rotor volume.

5. The motor/generator of claim 1, wherein the motor/generator housing has an annular stator top cover that attaches to an outside wall of the motor/generator housing forming a seal with the vacuum barrier.

6. The motor/generator of claim 1, wherein the vacuum barrier is constructed of a material impermeable to gas or liquid.

7. The motor/generator of claim 6, wherein the material impermeable to gas or liquid is selected from the group consisting of Parylene-C, polymer with deposited metal, low permeation polymer, PVDC, Kapton, glass, and ceramic.

8. The motor/generator of claim 1, wherein the shaft is a shaft of the flywheel rotor and turning the flywheel rotor shaft by the motor/generator turns the flywheel rotor.

9. The motor/generator of claim 1 wherein the central axis is a vertical axis, the rotor assembly rotates around the vertical axis and the radial gap is a horizontal gap.

10. The motor/generator of claim 1 wherein the central axis is a horizontal axis, the rotor assembly rotates around the horizontal axis and the radial gap is a vertical gap.

11. The motor/generator of claim 1, wherein the motor/generator is selected from the group of motor types consisting of induction synchronous, permanent magnet synchronous, brushless permanent magnet, synchronous reluctance, switched reluctance, and homopolar synchronous.

12. A motor/generator, which operates within a vacuum chamber, wherein during normal operation the vacuum chamber is evacuated of gas and operates at a lower air pressure than atmospheric air pressure, comprising:
   a motor/generator housing;
   a rotor assembly coupled to a shaft, wherein the rotor assembly is disposed inside the motor/generator housing;
   a stator assembly, inside the motor/generator housing, surrounding the rotor assembly, which attaches to the motor/generator housing and remains stationary; and
   a cylindrical vacuum barrier disposed between the rotor assembly and the stator assembly, and wherein the vacuum barrier together with the motor generator housing, partitions the motor/generator into an interior rotor volume and an exterior stator volume, wherein the interior rotor volume is sealed to block the exchange of gas or liquid with the stator volume, enabling the rotor volume to operate at the same air pressure as the vacuum chamber while the stator volume operates at a different air pressure.

13. The motor/generator of claim 12, wherein the motor/generator housing has one or more vents that enables gas or liquid to enter the stator volume.

14. The motor/generator of claim 13, wherein external air enters the stator volume through the one or more vents enabling the stator assembly to operate at atmospheric pressure.

15. The motor/generator of claim 12, further comprising one or more seals along the edges of the vacuum barrier to block the flow of gas or liquid into the interior rotor volume.

16. The motor/generator of claim 12, wherein the motor/generator housing has an annular stator top cover that attaches to an outside wall of the motor/generator housing forming a seal with the vacuum barrier.

17. The motor/generator of claim 12, wherein the vacuum barrier is constructed of a material impermeable to gas or liquid.

18. The motor/generator of claim 17, wherein the impermeable material impermeable to gas or liquid is selected from the group consisting of Parylene-C, polymer with deposited metal, low permeation polymer, PVDC, Kapton, glass, and ceramic.

19. The motor/generator of claim 12, wherein the motor/generator is selected from the group of motor types consisting of induction synchronous, permanent magnet synchronous, brushless permanent magnet, synchronous reluctance, switched reluctance, and homopolar synchronous.

* * * * *